United States Patent
Barnes et al.

(10) Patent No.: US 11,193,546 B2
(45) Date of Patent: Dec. 7, 2021

(54) BALL-RAMP CLUTCH ACTUATOR ASSEMBLY

(71) Applicant: Schaeffler Technologies AG & Co. KG, Herzogenaurach (DE)

(72) Inventors: Jay Barnes, Clinton Township, MI (US); Shaun Tate, Grand Blanc, MI (US); Alaa Makke, Farmington Hills, MI (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 51 days.

(21) Appl. No.: 16/787,117

(22) Filed: Feb. 11, 2020

(65) Prior Publication Data
US 2020/0256401 A1     Aug. 13, 2020

Related U.S. Application Data

(60) Provisional application No. 62/803,873, filed on Feb. 11, 2019.

(51) Int. Cl.
*F16D 23/12*    (2006.01)
*F16D 125/36*   (2012.01)

(52) U.S. Cl.
CPC ........ *F16D 23/12* (2013.01); *F16D 2023/123* (2013.01); *F16D 2125/36* (2013.01)

(58) Field of Classification Search
CPC ............... F16D 23/12; F16D 2125/36; F16D 2023/123; F16D 2300/12; F16D 13/52; F16D 2125/38
See application file for complete search history.

(56) References Cited

U.S. PATENT DOCUMENTS

| | | | | |
|---|---|---|---|---|
| 4,950,214 A | * | 8/1990 | Botterill | F16D 28/00 475/231 |
| 7,415,908 B2 | * | 8/2008 | Zernickel | B62D 1/184 280/775 |
| 2013/0327601 A1 | * | 12/2013 | Masuda | F16D 55/226 188/72.7 |
| 2014/0062237 A1 | * | 3/2014 | Riegler | H02K 7/003 310/77 |
| 2016/0319890 A1 | | 11/2016 | Jameson | |
| 2016/0327092 A1 | | 11/2016 | Carr et al. | |

* cited by examiner

*Primary Examiner* — Mark A Manley

(57) ABSTRACT

A ball-ramp clutch includes two stamped ramp plates and at least one molded support ring. The molded support ring transmits axial force from one of the ramp plates to a thrust bearing, which, in turn, transmits the axial force to the pressure plate of a clutch pack. The molded support ring may radially locate one of the races of the thrust bearing. The molded support ring may be plastic.

13 Claims, 2 Drawing Sheets

BALL-RAMP CLUTCH ACTUATOR ASSEMBLY

CROSS-REFERENCE TO RELATED APPLICATIONS

This application claims priority to U.S. Provisional Patent Application 62/803,873 filed Feb. 11, 2019, the entire disclosure of which is incorporated by reference herein.

TECHNICAL FIELD

The present disclosure relates generally to an actuator assembly for a clutch. More particularly, the disclosure relates to a ball-ramp assembly having stamped ramp plates and at least one support ring.

BACKGROUND

Transmission and driveline systems may include clutch assemblies which selectively connect two components for common rotation or non-rotation. When one of the two components is non-rotating, such as a transmission case, the clutch assembly may be called a brake. One known type of clutch assembly utilizes a clutch pack having a set of friction plates rotationally fixed to one of the components and interleaved with a set of separator plates rotationally fixed to the other component. When the clutch pack is squeezed, friction between the friction plates and separator plates transmits torque between the components urging them towards the same speed. When the squeezing force is released, the components are free to have different rotational speeds with relatively little torque transmitted via the clutch. The squeezing force is commonly applied by axially fixing a separator plate on one end of the clutch pack and applying an axially force to a separator plate on the other end of the clutch pack using an actuator. Various types of actuators are known which vary the axial force in response to a control signal from an operator or controller.

SUMMARY

An actuator assembly includes first and second ramp plates, a plurality if rolling elements, and a first support ring. The rolling elements are supported between the first and second ramp plates such that relative rotation between the ramp plates in an apply direction forces the ramp plates apart. The first support ring is fixed to the first ramp plate on an opposite side from the second ramp plate. The first support ring has a feature to radially locate a thrust bearing and is configured to transmit axial force from the first ramp plate to the thrust bearing. The actuator assembly may also include a second support ring rotationally fixed to the second ramp plate on an opposite side from the first ramp plate. The second support ring may include gear teeth. The first support ring may be a molded plastic part.

A clutch assembly includes a clutch pack, a thrust bearing, and a ball-ramp actuator assembly. The clutch pack includes a plurality of separator plates rotationally fixed with respect to a first element and a plurality of friction plates axially interleaved with the separator plates and rotationally fixed with respect to a second element. The thrust bearing has a first race in axial contact with one of the separator plates. The ball-ramp actuator assembly includes first and second stamped ramp plates separated by a plurality of rolling elements and a first support ring fixed to the first ramp plate and configured to radially locate a thrust bearing and to transmit axial force from the first ramp plate to the thrust bearing. The ball-ramp actuator assembly may also include a second support ring rotationally fixed to the second ramp plate. The second support ring may have gear teeth. The first support ring may be a molded plastic part.

A method of manufacturing an actuator assembly includes stamping first and second ramp plates, molding a first support ring, fixing the first support ring to the first ramp plate, and positioning a plurality of rollers between the first and second ramp plates such that relative rotation of the ramp plates in an apply direction forces the ramp plates apart. The method may also include piloting a thrust bearing on the first support ring. The first support ring may be plastic. The method may also include fixing a second support ring to the second ramp plate.

DETAILED DESCRIPTION

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The terminology used herein is for the purpose of describing particular aspects only, and is not intended to limit the scope of the present disclosure. Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

Figure 1:
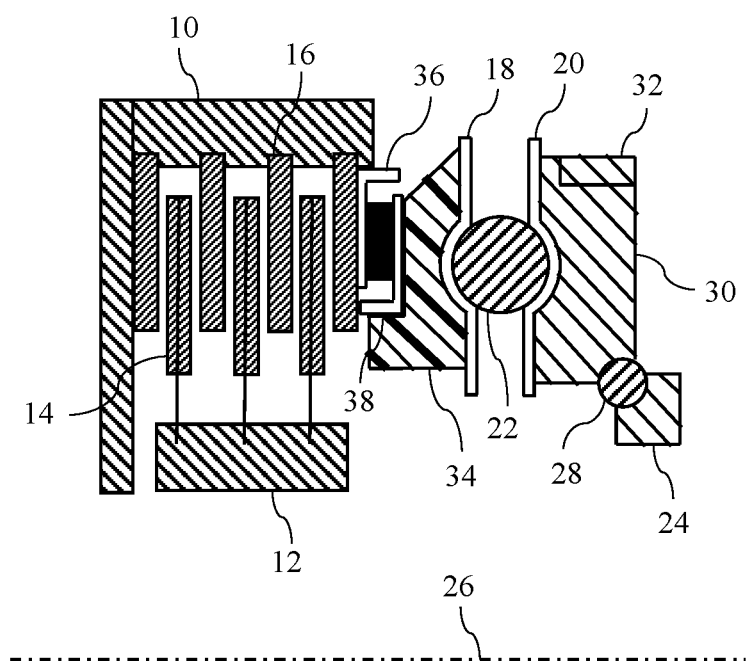
FIG. 1 is a cross-sectional view of a ball-ramp clutch assembly.

FIG. 1 illustrates a clutch assembly utilizing a ball-ramp actuator assembly. The clutch selectively couples two rotatable elements 10 and 12. A set of friction plates 14 are rotationally fixed to element 12, for example by a spline connection. Three friction plates are illustrated in FIG. 1 but the set may include as few as one friction plate. A plurality of separator plates 16 are rotationally fixed to element 10. The leftmost separator plate, which may be called a reaction plate, is restrained from axial movement further to the left. The rightmost separator plate may be called a pressure plate.

With the exception of the reaction plate, the separator plates and friction plates may have some axial freedom of motion to move between a released state and an applied state. In the released state, illustrated in FIG. 1, there is some space between the plates to avoid transfer of torque. In the applied state, the friction plates are squeezed between the separator plates.

The actuator mechanism includes two stamped ramp plates 18 and 20. Stamped ramp plates are more economical to manufacture in high volume than machined ramp plates. A plurality of rolling elements 22, such as balls, are installed between the ramp plates in grooves. The balls may be held in position relative to one another by a cage (not shown). The grooves vary in depth circumferentially. The separation distance between plates 18 and 20 depends upon the depth of the groove at the location of the balls. When the ramp plates are rotated with respect to one another, the balls move within the grooves. When the ramp plates are rotated with respect to one another in an apply direction, the balls roll to a shallower portion of the groove pushing the ramp plates apart. When the ramp plates are rotated with respect to one another in a release direction, the balls roll to a deeper portion of the groove allowing the plates to move towards one another.

Ramp plate 20 is supported within housing 24 for rotation about axis 26 by bearings 28. Bearings 28 directly support support ring 30 which is fixed to ramp plate 20. Ramp plate 20 and support ring 30 are at a fixed axial location relative to housing 24. Support ring 30 includes a set of gear teeth 32 which mesh with a drive gear (not shown) to rotate ramp plate 20. Support ring 34 is fixed to ramp plate 18. Ramp plate 18 and support 34 are supported such that they can move axially along axis 26 but they are held against rotation with respect to housing 24. Thrust bearing 36 transmits axial force from support ring 34 to the pressure plate while permitting relative rotation. Unlike other components, support ring 34 does not need to be made of especially hard materials. Therefore, it may be molded from plastic, permitting high volume production at lower cost than other manufacturing methods. To apply the clutch, torque is applied at gear teeth 32 rotating ramp plate 20 in an apply direction. This forces plates 18 and 20 apart. Axial force is transferred by support 34 and thrust bearing 36 to squeeze the clutch pack. To release the clutch, ramp plate 20 is rotated in a release direction. A return spring (not shown) opens up the clutch pack as ramp plate 18 moves rightward.

It is important that all components be radially located relative to axis 26. Elements 10 and 12 are supported for rotation about axis 26 by conventional transmission bearing technology. As previously mentioned, support 30 and ramp plate 20 are radially located by bearing 28. Balls 22 are radially located by the grooves in ramp plate 20. Ramp plate 18 and support ring 34 are radially located by balls 22. One race of thrust bearing 36 is radially located by a pilot feature 38 of support ring 34. The other race of thrust bearing 36 is radially located by element 10.

Figure 2:
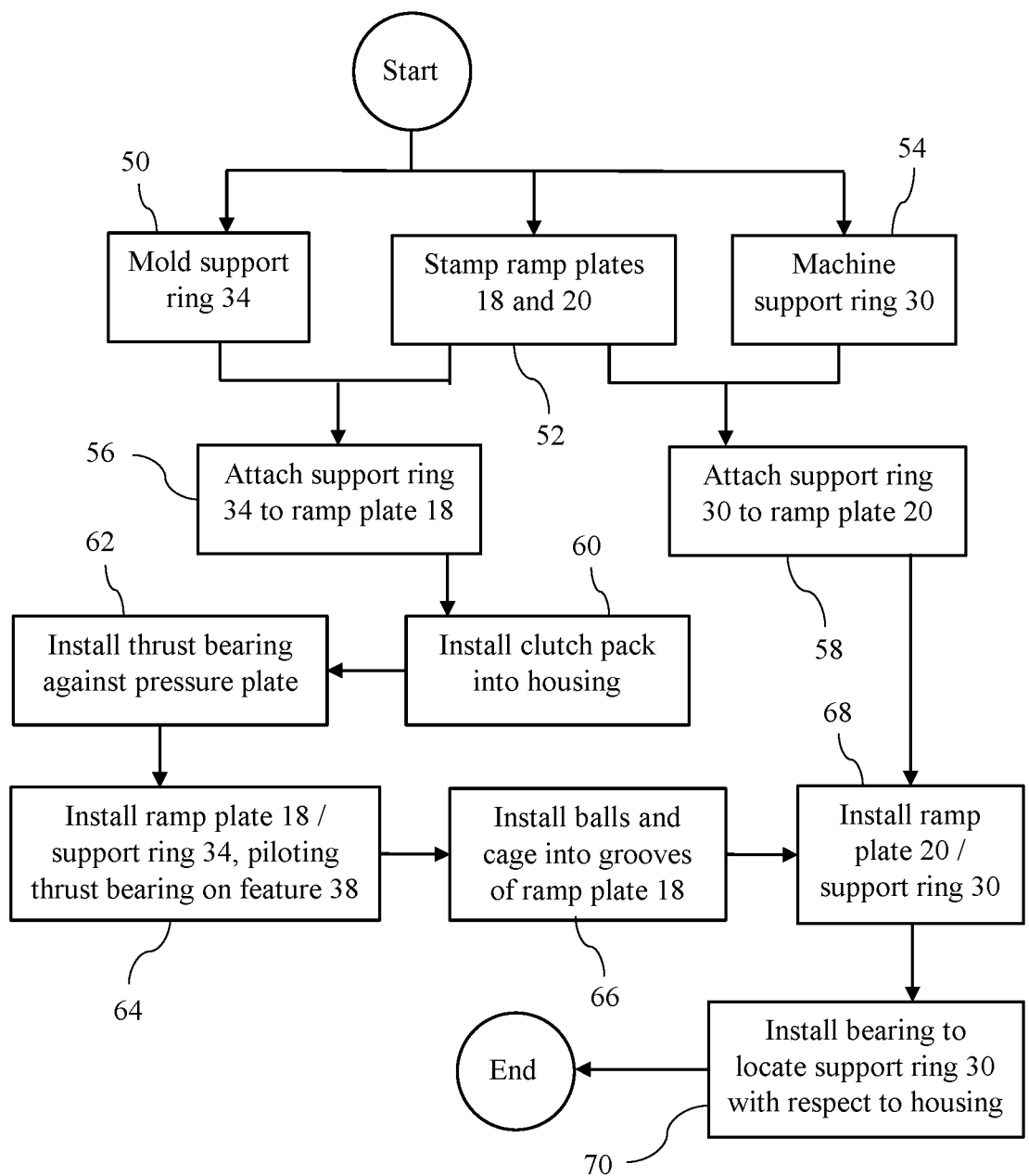
FIG. 2 is a flow chart for a method of fabricating and assembling the ball-ramp clutch assembly of FIG. 1.

FIG. 2 illustrates the process of manufacturing the clutch of FIG. 1. Key components are fabricated in steps 50-54. At 50, support 34 is molded, for example from plastic. When feasible, molding is a cost-effective method of manufacturing parts in high volume. At 52, the ramp plates are fabricated from sheet metal using a stamping process. At 54, support 30 is fabricated by machining to achieve the necessary hardness and precision for gear teeth and a bearing race. At 56 and 58, the support rings are attached to the respective ramp plates, for example by snap fit, adhesive, or a combination.

In steps 60-70, the components are installed in a housing. The housing may be positioned with axis 26 vertical during the assembly process such that gravity tends to hold parts in position until mating parts are installed. At 60, the clutch pack is installed in the housing. At 62, thrust bearing 36 is positioned against the pressure plate. At 64, the sub-assembly consisting of ramp plate 18 and support ring 34 is installed. Piloting feature 38 of support ring 34 locates the inner race of thrust bearing 36 relative to support ring 34. At 66, the rolling elements 22, preferably retained in a cage, are placed in the grooves of ramp plate 18 such that they rest in the deepest portion of the grooves. At 68, the sub-assembly of ramp plate 20 and support ring 30 is placed such that the rolling elements are in the deepest section of the grooves of ramp plate 20. Finally, at 70, bearing 28 is installed and pre-tension is set to hold all of the components in the position associated with the released state.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, to the extent any embodiments are described as less desirable than other embodiments or prior art implementations with respect to one or more characteristics, these embodiments are not outside the scope of the disclosure and can be desirable for particular applications.

What is claimed is:

1. An actuator assembly comprising:
   first and second stamped ramp plates;
   a plurality of rolling elements supported between the first and second ramp plates such that relative rotation between the ramp plates in an apply direction forces the ramp plates apart; and
   a first support ring fixed to the first ramp plate on an opposite side from the second ramp plate, the first support ring having a feature to radially locate a radially inner race of a thrust bearing and configured to transmit axial force from the first ramp plate to the thrust bearing.

2. The actuator assembly of claim 1 further comprising a second support ring rotationally fixed to the second ramp plate on an opposite side from the first ramp plate.

3. The actuator assembly of claim 2 wherein the second support ring includes gear teeth.

4. The actuator assembly of claim 1 wherein the first support ring is a molded part.

5. The actuator assembly of claim 1 wherein the first support ring is made of plastic.

6. A clutch assembly comprising:
   a clutch pack including a plurality of separator plates rotationally fixed with respect to a first element and a plurality of friction plates axially interleaved with the separator plates and rotationally fixed with respect to a second element;

a thrust bearing having a first race in axial contact with one of the separator plates; and a ball-ramp actuator assembly including first and second stamped ramp plates separated by a plurality of rolling elements and a first support ring fixed to the first ramp plate and configured to radially locate a radially inner race of the thrust bearing and to transmit axial force from the first ramp plate to the thrust bearing.

7. The clutch assembly of claim 6 wherein the ball-ramp actuator assembly further includes a second support ring rotationally fixed to the second ramp plate.

8. The clutch assembly of claim 7 wherein the second support ring includes gear teeth.

9. The clutch assembly of claim 6 wherein the first support ring is a molded part.

10. The clutch assembly of claim 9 wherein the first support ring is made of plastic.

11. A method of manufacturing an actuator assembly comprising:

stamping first and second ramp plates;

molding a first support ring;

fixing the first support ring to the first ramp plate;

piloting a radially inner race of a thrust bearing on the first support ring and positioning a plurality of rollers between the first and second ramp plates such that relative rotation of the ramp plates in an apply direction forces the ramp plates apart.

12. The method of claim 11 wherein the first support ring is plastic.

13. The method of claim 11 further comprising fixing a second support ring to the second ramp plate.

\* \* \* \* \*